United States Patent
Lin

(10) Patent No.: US 11,375,525 B2
(45) Date of Patent: Jun. 28, 2022

(54) METHOD FOR TRANSMITTING INFORMATION, METHOD FOR RECEIVING INFORMATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/886,600

(22) Filed: May 28, 2020

(65) Prior Publication Data

US 2020/0296746 A1    Sep. 17, 2020

Related U.S. Application Data

(63) Continuation of application No. PCT/CN2018/075746, filed on Feb. 8, 2018.

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0055* (2013.01); *H04W 72/0446* (2013.01);
(Continued)

(58) Field of Classification Search
None
See application file for complete search history.

(56) References Cited

U.S. PATENT DOCUMENTS

| 9,413,505 B2 * | 8/2016 | Li .......................... H04L 5/0048 |
| 2002/0058525 A1 * | 5/2002 | Kasapi ................. H04B 7/2643 |
| | | 455/526 |

(Continued)

FOREIGN PATENT DOCUMENTS

| CN | 103220070 A | 7/2013 |
| CN | 105025574 A | 11/2015 |

(Continued)

OTHER PUBLICATIONS

International Search Report in the international application No. PCT/CN2018/075746, dated Nov. 1, 2018.
(Continued)

*Primary Examiner* — Andrew C Oh
(74) *Attorney, Agent, or Firm* — Perkins Coie LLP

(57) ABSTRACT

Provided are a method for transmitting information, a method for receiving information, a terminal device and a network device. The method includes that: a terminal device determines multiple uplink channels/signals to be transmitted, the multiple uplink channels/signals at least partially overlapping in time domain; and the terminal device determines to transmit one of the multiple uplink channels/signals according to first information related to at least one of the multiple uplink channels/signals. In the embodiments of the disclosure, according to the first information related to at least one of the multiple uplink channels/signals, the terminal device can clearly determine to transmit one of the multiple uplink channels/signals, thereby improving the success rate of transmission.

16 Claims, 17 Drawing Sheets

(51) Int. Cl.
*H04W 72/04* (2009.01)
*H04W 80/08* (2009.01)

(52) U.S. Cl.
CPC ... *H04W 72/1257* (2013.01); *H04W 72/1289* (2013.01); *H04W 80/08* (2013.01)

(56) References Cited

U.S. PATENT DOCUMENTS

| | | | | |
|---|---|---|---|---|
| 2002/0135585 | A1* | 9/2002 | Dye | G06T 1/60 345/531 |
| 2002/0145611 | A1* | 10/2002 | Dye | G09G 5/363 345/543 |
| 2003/0118241 | A1* | 6/2003 | Zandi | H04N 19/61 375/E7.064 |
| 2004/0002357 | A1* | 1/2004 | Benveniste | H04W 72/12 455/562.1 |
| 2011/0199991 | A1* | 8/2011 | Harris | H04W 72/1263 370/329 |
| 2011/0243066 | A1* | 10/2011 | Nayeb Nazar | H04B 1/7097 370/328 |
| 2012/0057535 | A1 | 3/2012 | Zhang et al. | |
| 2012/0057561 | A1* | 3/2012 | Mabuchi | H04L 5/0082 370/329 |
| 2012/0082130 | A1* | 4/2012 | Xue | H04L 5/0094 370/330 |
| 2012/0250551 | A1* | 10/2012 | Sartori | H04W 48/12 370/252 |
| 2013/0094458 | A1* | 4/2013 | Sartori | H04L 5/0044 370/328 |
| 2013/0250893 | A1* | 9/2013 | Li | H04L 1/0031 370/329 |
| 2014/0036865 | A1* | 2/2014 | Camarda | H04L 5/0057 370/330 |
| 2014/0050205 | A1* | 2/2014 | Ahn | H04L 5/0051 370/336 |
| 2014/0126487 | A1* | 5/2014 | Chen | H04L 1/0038 370/329 |
| 2014/0192757 | A1* | 7/2014 | Lee | H04L 1/1671 370/329 |
| 2014/0369242 | A1* | 12/2014 | Ng | H04W 72/0453 370/280 |
| 2014/0369324 | A1* | 12/2014 | Lin | H04W 72/0453 370/336 |
| 2015/0036607 | A1* | 2/2015 | Park | H04L 5/0048 370/329 |
| 2015/0208390 | A1* | 7/2015 | Zhao | H04W 72/042 370/330 |
| 2015/0215905 | A1* | 7/2015 | Park | H04W 76/00 370/329 |
| 2015/0304862 | A1* | 10/2015 | Nagaraja | H04W 24/02 455/418 |
| 2015/0341866 | A1* | 11/2015 | Park | H04L 1/1812 370/280 |
| 2015/0341922 | A1* | 11/2015 | Han | H04W 28/08 370/280 |
| 2015/0341992 | A1* | 11/2015 | Hatano | G09F 9/33 313/117 |
| 2016/0095093 | A1* | 3/2016 | Yi | H04L 5/14 370/280 |
| 2016/0192333 | A1* | 6/2016 | Wang | H04L 1/0026 370/329 |
| 2016/0234694 | A1* | 8/2016 | Yamazaki | H04B 7/0452 |
| 2016/0242121 | A1 | 8/2016 | Lin et al. | |
| 2016/0295561 | A1* | 10/2016 | Papasakellariou | H04L 5/0094 |
| 2017/0006426 | A1* | 1/2017 | Fu | G01S 5/0263 |
| 2017/0006628 | A1* | 1/2017 | Takahashi | H04L 5/0064 |
| 2017/0013565 | A1* | 1/2017 | Pelletier | H04W 52/367 |
| 2017/0041829 | A1 | 2/2017 | Dai et al. | |
| 2017/0086168 | A1* | 3/2017 | Takahashi | H04W 72/04 |
| 2017/0094687 | A1* | 3/2017 | Kato | H04W 74/0833 |
| 2017/0222856 | A1 | 8/2017 | Dinan | |
| 2017/0223695 | A1 | 8/2017 | Kwak et al. | |
| 2017/0230843 | A1* | 8/2017 | Ouchi | H04W 52/367 |
| 2017/0257852 | A1* | 9/2017 | Wu | H04W 74/0833 |
| 2017/0289733 | A1* | 10/2017 | Rajagopal | H04L 5/0096 |
| 2018/0048451 | A1* | 2/2018 | Yin | H04L 1/1854 |
| 2018/0049219 | A1* | 2/2018 | Gupta | H04W 72/1247 |
| 2018/0092129 | A1* | 3/2018 | Guo | H04B 7/0695 |
| 2018/0124712 | A1 | 5/2018 | Lin et al. | |
| 2018/0167932 | A1* | 6/2018 | Papasakellariou | H04L 1/1671 |
| 2018/0199381 | A1 | 7/2018 | Rong et al. | |
| 2018/0227031 | A1* | 8/2018 | Guo | H04W 24/10 |
| 2018/0242326 | A1* | 8/2018 | Aiba | H04W 28/06 |
| 2018/0288790 | A1* | 10/2018 | Kim | H04L 1/0038 |
| 2018/0310193 | A1* | 10/2018 | Bhorkar | H04L 5/0057 |
| 2018/0331792 | A1* | 11/2018 | Yang | H04W 72/0413 |
| 2018/0367285 | A1* | 12/2018 | Yi | H04L 5/0055 |
| 2019/0014596 | A1* | 1/2019 | Yang | H04W 74/0808 |
| 2019/0103951 | A1* | 4/2019 | Park | H04L 1/1861 |
| 2019/0116611 | A1* | 4/2019 | Lee | H04W 72/1284 |
| 2019/0158334 | A1* | 5/2019 | Kim | H04L 5/0083 |
| 2019/0159230 | A1* | 5/2019 | Kim | H04W 72/1268 |
| 2019/0159241 | A1* | 5/2019 | Aiba | H04W 28/06 |
| 2019/0261341 | A1* | 8/2019 | Tang | H04W 72/0413 |
| 2019/0268938 | A1* | 8/2019 | Zhao | H04W 80/08 |
| 2019/0297619 | A1* | 9/2019 | Liu | H04W 76/27 |
| 2019/0349942 | A1* | 11/2019 | Li | H04L 1/1819 |
| 2020/0029352 | A1* | 1/2020 | Aiba | H04W 72/14 |
| 2020/0084762 | A1* | 3/2020 | Gou | H04L 1/1861 |
| 2020/0107333 | A1* | 4/2020 | Lin | H04L 1/0027 |
| 2020/0145961 | A1* | 5/2020 | Harada | H04L 5/0094 |
| 2020/0205084 | A1* | 6/2020 | Chen | H04W 52/146 |
| 2020/0235885 | A1* | 7/2020 | Su | H04L 5/0044 |
| 2020/0288458 | A1* | 9/2020 | Takeda | H04L 5/0055 |
| 2020/0288482 | A1* | 9/2020 | Yi | H04L 5/0037 |
| 2020/0344770 | A1* | 10/2020 | Yuan | H04B 7/0626 |
| 2020/0344786 | A1* | 10/2020 | Tang | H04W 72/1284 |
| 2020/0374912 | A1* | 11/2020 | Takeda | H04W 72/0446 |

FOREIGN PATENT DOCUMENTS

| | | |
|---|---|---|
| CN | 105850057 A | 8/2016 |
| CN | 106507497 A | 3/2017 |
| CN | 106992804 A | 7/2017 |
| CN | 107534834 A | 1/2018 |
| JP | 2017092614 A | 5/2017 |
| WO | 2012169815 A2 | 12/2012 |
| WO | 2017050868 A1 | 3/2017 |

OTHER PUBLICATIONS

"Multiplexing of AN and SR on PUCCH", 3GPP TSG RAN WG1 Meeting AH 1801 R1-1801173, Vancouver, Canada, Jan. 22-26, 2018, Agenda item 7.3.2.1.

Ericsson,"Summary of Discussions on Multiplexing Different UCI types on a PUCCH resource", 3GPP TSG RAN WG1 Meeting AH 1801 R1-1801262, Vancouver, Canada, Jan. 22-26, 2018 Agenda Item: 7.3.2.1.

Written Opinion of the International Search Authority in the international application No. PCT/CN2018/075746, dated Nov. 1, 2018.

Qualcomm Incorporated: "Summary of remaining issues for UCI piggyback on PUSCH", 3GPP Draft; R1-1801263 Summary of Remaining Issues for UCI Multiplexing on PUSCH, 3rd Generation Partnership Project(3GPP), Mobi Le Competence Centre; 650, Route Des Lucioles; F-06921 Sophia-Antipol, vol. RAN WG1, No. Vancouver, Canada; Jan. 22, 2018-Jan. 26, 2018, Jan. 29, 2018 (Jan. 29, 2018), XP051385482, *Section "2.4 Partially overlapped PUCCH and PUSCH"*.

Sharp: "Simultaneous PUCCH and PUSCH transmission and collision handling" 3GPP Draft; R1-1718418, 3rd Generation Partnership Project(3GPP). Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), XP051341600, Retrieved from the Internet: URL: http://www.3gpp. org/ftp/Meetings 3GPP SYNC/RAN1/ Docs/[ retrieved on Oct. 8, 2017] *the whole document *.

Supplementary European Search Report in the European application No. 18905687.2, dated Oct. 6, 2020.

(56) References Cited

OTHER PUBLICATIONS

3GPP TSG RAN WG1 Meeting #89 R1-1708374, Hangzhou, P. R. China May 15-19, 2017; Source: Sharp; Title: UCI reporting on PUCCH and PUSCH.
3GPP TSG RAN WG1 NR Ad Hoc Meeting R1-1700729, Spokane, USA, Jan. 16-20, 2017; Source: Sharp; Title: UCI reporting on PUCCH and PUSCH.
First Office Action of the Chinese application No. 202010261390.3, dated Apr. 30, 2021.
First Office Action of the European application No. 18905687.2, dated May 26, 2021.
First Office Action of the Chilean application No. 202001799, dated Aug. 19, 2021. 21 pages with English translation.
Office Action of the Indian application No. 202027031209, dated Sep. 10, 2021. 7 pages with English translation.
First Office Action of the Indonesian application No. P00202005691, dated Sep. 13, 2021. 9 pages with English translation.
First Office Action of the Japanese application No. 2020-531447, dated Jan. 14, 2022. 12 pages with English translation.
Huawei, HiSilicon. "Summary of remaining issues on UL data transmission procedure", 3GPP TSG RAN WG1 NR Ad Hoc Meeting R1-1800060, Vancouver, Canada, Jan. 22-26, 2018. 6 pages.
Second Office Action of the Chilean application No. 202001799, dated Dec. 17, 2021. 18 pages with English translation.
Second Office Action of the European application No. 18905687.2, dated Nov. 29, 2021. 8 pages.

\* cited by examiner

METHOD FOR TRANSMITTING INFORMATION, METHOD FOR RECEIVING INFORMATION, TERMINAL DEVICE, AND NETWORK DEVICE

CROSS-REFERENCE TO RELATED APPLICATION

This application claims priority to and is a continuation of PCT Application No. PCT/CN2018/075746 filed to the State Intellectual Property Office on Feb. 8, 2018 and the amended claims received by International Bureau on Jun. 17, 2019, the entire contents of which are hereby incorporated by reference.

TECHNICAL FIELD

The embodiments of the disclosure relate to the field of communication, and in particular to a method for transmitting information, a method for receiving information, a terminal device and a network device.

BACKGROUND

In a New Radio (NR) system under 5-Generation (5G) mobile communication technology, Physical Uplink Control Channels (PUCCHs) of two time lengths, namely a short-PUCCH and a long-PUCCH, are supported. The short-PUCCH includes one or two time domain symbols which may be transmitted on any symbol in a slot, and the long-PUCCH includes 4 to 14 time domain symbols. Moreover, a Physical Uplink Shared Channel (PUSCH) in a 5G system supports flexible scheduling, that is, a start position and a duration in time domain may be dynamically configured. Therefore, for a User Equipment (UE), there may be multiple overlaps between a PUSCH and a PUCCH to be transmitted in time domain.

However, when there are both a PUCCH and a PUSCH in a carrier, a NR system does not support simultaneous transmission of two channels. There has been no solution for determine corresponding transmission schemes for different overlapping situations.

SUMMARY

A method for transmitting information, a method for receiving information, a terminal device and a network device are provided.

A first aspect provides a method for transmitting information, which may include that:

A terminal device determines multiple uplink channels to be transmitted, the multiple uplink channels at least partially overlapping in time domain; and the terminal device determines to transmit one of the multiple uplink channels/signals according to at least one of a time domain position or a category of first information associated with at least one of the multiple uplink channels.

A second aspect provides a method for receiving information, which may include that:

a network device determines multiple uplink channels to be received, the multiple uplink channels at least partially overlapping in time domain; and the network device determines to receive one of the multiple uplink channels according to at least one of a time domain position or a category of first information associated with at least one of the multiple uplink channels.

A third aspect provides a terminal device, which may include a processor and a transceiver.

The processor is configured to determine multiple uplink channels to be transmitted, the multiple uplink channels at least partially overlapping in time domain.

The transceiver is connected to the processor and is configured to determine to transmit one of the multiple uplink channels according to at least one of a time domain position or a category of first information associated with at least one of the multiple uplink channels.

A fourth aspect provides a network device, which may include a processor and a transceiver.

The processor is configured to determine multiple uplink channels to be received, the multiple uplink channels at least partially overlapping in time domain; and The transceiver is connected to the processor and is configured to determine to receive one of the multiple uplink channels according to at least one of a time domain position or a category of first information associated with at least one of the multiple uplink channels.

DETAILED DESCRIPTION

Figure 1:
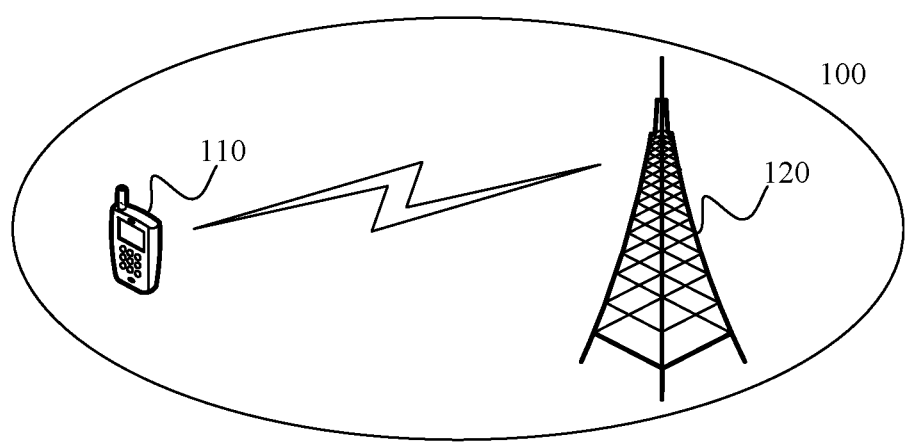
FIG. 1 is an example of an application scenario according to the disclosure.

FIG. 1 is a schematic diagram of an application scenario according to an embodiment of the disclosure.

As shown in FIG. 1, a communication system 100 may include a terminal device 110 and a network device 120. The network device 120 may communicate with the terminal device 110 through an air interface. Multi-service transmission can be supported between the terminal device 110 and the network device 120.

It is to be understood that the embodiments of the disclosure are described only with the communication system 100 as an example and the embodiments of the disclosure are not limited thereto. That is, the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, LTE Time Division Duplex (TDD), and a Universal Mobile Telecommunication System (UMTS).

In addition, each embodiment of the disclosure is described in combination with the network device and the terminal device.

The network device 120 may refer to any entity configured to send or receive a signal on a network side, and for example, may be Machine Type Communication (MTC) User Equipment (UE), a Base Transceiver Station (BTS) in the GSM or CDMA, a NodeB in WCDMA, an Evolution Node B (eNB or eNodeB) in LTE and a base station device in a 5th-Generation (5G) network.

The terminal device 110 may be any terminal device. The terminal device 110 may communicate with one or more Core Networks (CNs) through a Radio Access Network (RAN), may also be called an access terminal, User Equipment (UE), a user unit, a user station, a mobile station, a mobile radio station, a remote station, a remote terminal, a mobile device, a user terminal, a terminal, a wireless communication device, a user agent or a user device. For example, the terminal device may be a cell phone, a cordless phone, a Session Initiation Protocol (SIP) phone, a Wireless Local Loop (WLL) station, a Personal Digital Assistant (PDA), a handheld device with a wireless communication function, a computing device, other processing devices connected to a wireless modem, a vehicle-mounted device, a wearable device and a terminal device in a 5G network.

Figure 2:
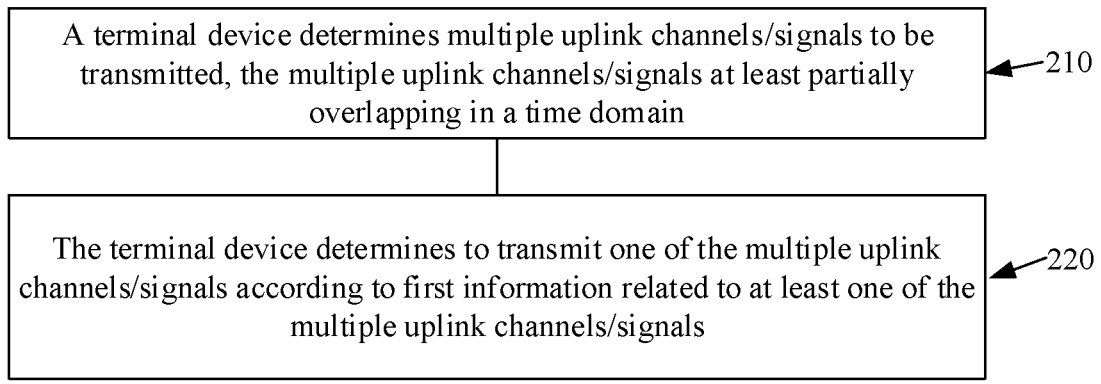
FIG. 2 is a schematic flowchart of a method for transmitting information according to an embodiment of the disclosure.

FIG. 2 is a schematic flowchart of a method for transmitting information according to an embodiment of the disclosure.

Specifically, as shown in FIG. 2, the method may include the following steps.

At 210, a terminal device determines multiple uplink channels/signals to be transmitted, the multiple uplink channels/signals at least partially overlapping in time domain.

At 220, the terminal device determines to transmit one of the multiple uplink channels/signals according to first information related to at least one of the multiple uplink channels/signals.

The uplink channels/signals may include, but not limited to, at least one of:

a physical uplink shared channel (PUSCH); a physical uplink control channel (PUCCH); and a sounding reference signal (SRS).

In the embodiments of the disclosure, according to the first information associated with at least one of the multiple uplink channels/signals, the terminal device can clearly determine to transmit one of the multiple uplink channels/signals, thereby improving the success rate of transmission and user experience.

It is to be understood that the first information associated with the multiple uplink channel/signals in the embodiments of the disclosure may be scheduling information associated with the channel/signal or configuration information associated with the channel/signal, which is not limited by the embodiments of the disclosure. It is to be further understood that the first information associated with at least one of the multiple uplink channels/signals in the embodiments of the disclosure may refer to the first information associated with each of the uplink channels/signals, that is, one uplink channel/signal may correspond to a piece of first information.

For example, when the channel/signal is a dynamically scheduled PUSCH, the first information may be the scheduling information corresponding to the PUSCH, for example, DCI format 0_0 and DCI format 0_1. For another example, when the channel/signal is a PUCCH carrying ACK/NACK feedback information corresponding to a dynamically scheduled PDSCH, the first information may be scheduling information corresponding to the PDSCH, for example, DCI format 1_0 and DCI format 1_1. For another example, when the channel/signal is a PUCCH carrying aperiodic CSI, the first information may be information for triggering the aperiodic CSI, or the first information may be information for indicating transmission parameters of the PUCCH; and when the channel/signal is an aperiodic SRS, the first information may be information for triggering the aperiodic SRS.

In other embodiments, for example, when the channel/signal is an SPS PUSCH, the first information may be configuration information for indicating the resource of the PUSCH. For another example, when the channel/signal is a PUCCH carrying ACK/NACK feedback information corresponding to an SPS PDSCH, the first information may be information for indicating the resource of the PUCCH. For another example, when the channel/signal is a PUCCH carrying periodic CSI or SPS CSI, the first information may be information for indicating the resource of the PUCCH. For another example, when the channel/signal is a periodic SRS, the first information may be information for indicating resource configuration of the periodic SRS.

The implementation mode that the terminal device determines to transmit one of the multiple uplink channels/signals according to the first information associated with at least one of the multiple uplink channels/signals is described below.

In an embodiment, the terminal device may determine to transmit one of the multiple uplink channels/signals according to a time domain position and/or a category of the first information associated with the at least one of the multiple uplink channels/signals. In another embodiment, the terminal device may determine to transmit one of the multiple uplink channels/signals according to the first information associated with each of the multiple uplink channels/signals. For example, the terminal device may determine to transmit one of the multiple uplink channels/signals according to a category of the first information associated with each of the multiple uplink channels/signals. In a specific embodiment, the terminal device may determine to transmit the uplink channel/signal corresponding to a category of first information with the highest priority among the categories of the first information associated with the multiple uplink channels/signals. The categories of the first information may include, but not limited to: DCI and/or higher layer signaling. The DCI may include, but not limited to the first information associated with at least one of the following channels/signals: a dynamically scheduled PUSCH; a PUCCH carrying ACK/NACK feedback information corresponding to a dynamically scheduled PDSCH; a PUCCH carrying aperiodic CSI; and an aperiodic SRS. The higher layer signaling may include, but not limited to the first information associated with at least one of the following channels/signals: a SPS PUSCH; a PUCCH carrying ACK/NACK feedback information corresponding to a SPS PDSCH; a PUCCH carrying aperiodic CSI; a PUCCH carrying SPS CSI; and a periodic SRS. DCI has higher priority than higher layer signaling.

Figure 3:
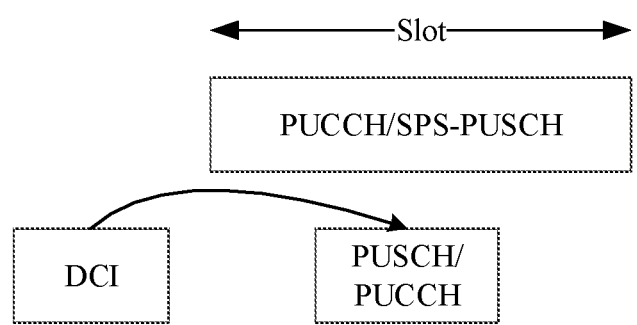
FIG. 3 is an example of a scenario where there are two channels/signals for a terminal device according to an embodiment of the disclosure.
Figure 4:
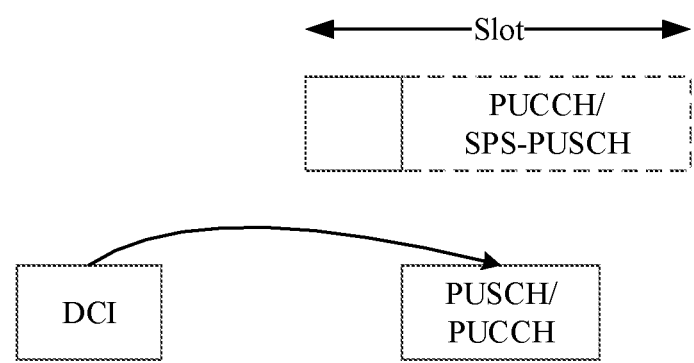
FIG. 4 is a schematic block diagram illustrating that a terminal device determines, according to a category of first information, to transmit one of multiple uplink channels/signals in the scenario in FIG. 3 according to an embodiment of the disclosure.
Figure 5:
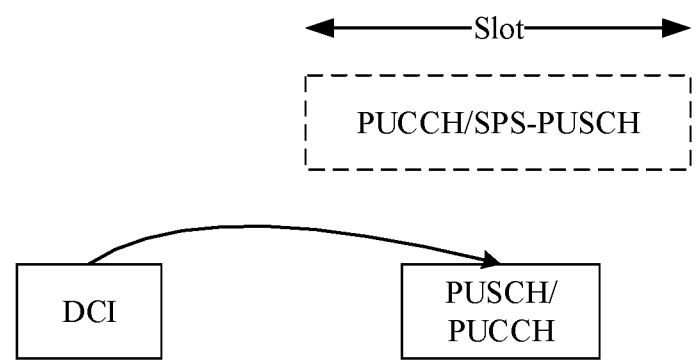
FIG. 5 is a schematic block diagram illustrating that a terminal device determines, according to a category of first information, to transmit one of multiple uplink channels/signals in the scenario in FIG. 3 according to an embodiment of the disclosure.
Figure 6:
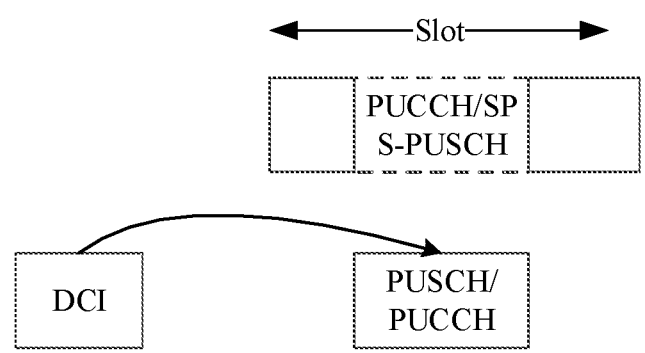
FIG. 6 is a schematic block diagram illustrating that a terminal device determines, according to a category of first information, to transmit one of multiple uplink channels/signals in the scenario in FIG. 3 according to an embodiment of the disclosure.

With reference to FIG. 3 to FIG. 6. FIG. 3 is an example of a scenario where there are two channels/signals for the terminal device according to an embodiment of the disclosure. FIG. 4 to FIG. 6 are schematic block diagrams that a terminal device determines, according to a category of first information, to transmit one of multiple uplink channels/signals in the scenario in FIG. 3 according to an embodiment of the disclosure.

As shown in FIG. 3, two channels/signals to be transmitted by the terminal device may include: a PUCCH carrying CSI (or a SPS PUSCH) and a dynamically scheduled PUSCH (a PUCCH carrying ACK/NACK feedback information corresponding to a dynamically scheduled PDSCH). The scheduling information corresponding to the PUCCH carrying the CSI (or the SPS PUSCH) may be higher layer signaling, and the transmission parameters of the PUCCH carrying the CSI may be configured through the higher layer signaling. Scheduling signaling corresponding to the dynamically scheduled PUSCH (the PUCCH carrying the ACK/NACK feedback information corresponding to the dynamically scheduled PDSCH) may be downlink control signaling. Then, the terminal device may determine that the priority of the dynamically scheduled PUSCH (the PUCCH carrying the ACK/NACK feedback information corresponding to the dynamically scheduled PDSCH) is high. Thus, the terminal device may determine that only the dynamically scheduled PUSCH (the PUCCH carrying the ACK/NACK feedback information corresponding to the dynamically scheduled PDSCH) is transmitted in an overlap of the time domain. Specifically, as shown in FIG. 4, the terminal device may determine that in a slot, only the dynamically scheduled PUSCH (the PUCCH carrying the ACK/NACK feedback information corresponding to the dynamically scheduled PDSCH) is transmitted from the overlap of the time domain.

As shown in FIG. 5, the terminal device may also determine that in a slot, only the dynamically scheduled PUSCH (the PUCCH carrying the ACK/NACK feedback information corresponding to the dynamically scheduled PDSCH) is transmitted. As shown in FIG. 6, the terminal device may also determine that in a slot, the dynamically scheduled PUSCH (the PUCCH carrying the ACK/NACK feedback information corresponding to the dynamically scheduled PDSCH) is transmitted only in the overlap. It is to be understood that the solid boxes in FIG. 4 to FIG. 6 represent that transmission is performed, and the dashed boxes represent that the transmission is not preformed.

It is to be understood that the slot mentioned above is described as an example only, and the embodiments of the disclosure are not limited thereto. A transmission time unit or a symbol can also be taken as an example.

The embodiments of the disclosure take that DCI has higher priority than higher layer signaling as an example. It is to be understood that in other embodiments, the priority of the higher layer signaling may also be higher than the priority of the DCI, which is not limited by the embodiments of the disclosure.

In another specific embodiment, the terminal device may determine to transmit one of the multiple uplink channels/signals according to the time domain position of the first information associated with each of the multiple uplink channels/signals. For example, the terminal device may determine to transmit an uplink channel/signal corresponding to the first information with the highest priority among the first information associated with the multiple uplink channels/signals. In a specific embodiment, the terminal device may determine to transmit an uplink channel/signal corresponding to the first information with a start position at the end in the time domain among the first information associated with the multiple uplink channels/signals. That is, in the time domain, first information with a later start position has higher priority than first information with an earlier start position.

Figure 7:
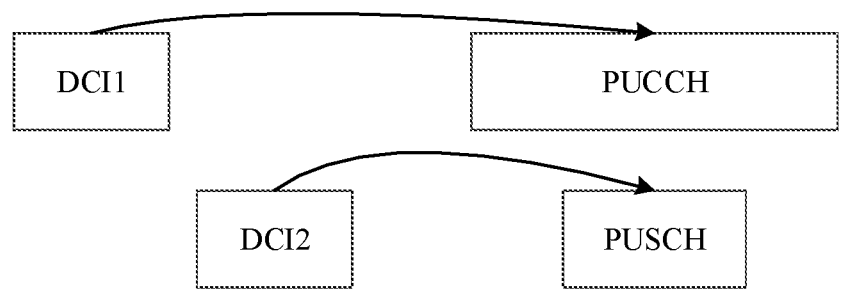
FIG. 7 is an example of another scenario where there are two channels/signals for a terminal device according to an embodiment of the disclosure.
Figure 8:
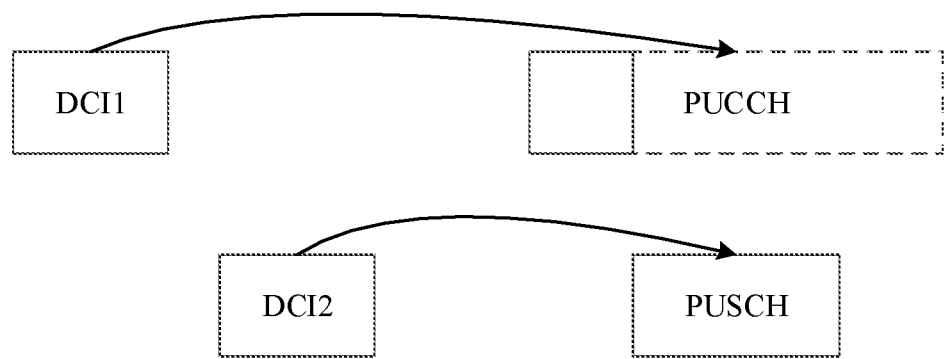
FIG. 8 is a schematic block diagram illustrating that a terminal device determines, according to a time domain position of first information, to transmit one of multiple uplink channels/signals in the scenario in FIG. 7 according to an embodiment of the disclosure.
Figure 9:
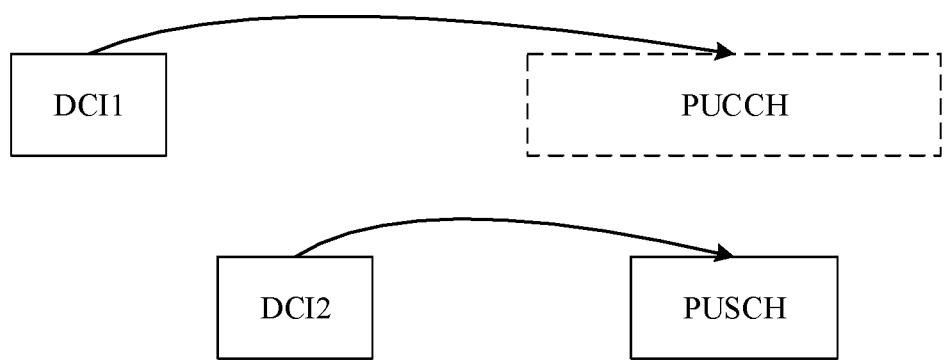
FIG. 9 is a schematic block diagram illustrating that a terminal device determines, according to a time domain position of first information, to transmit one of multiple uplink channels/signals in the scenario in FIG. 7 according to an embodiment of the disclosure.
Figure 10:
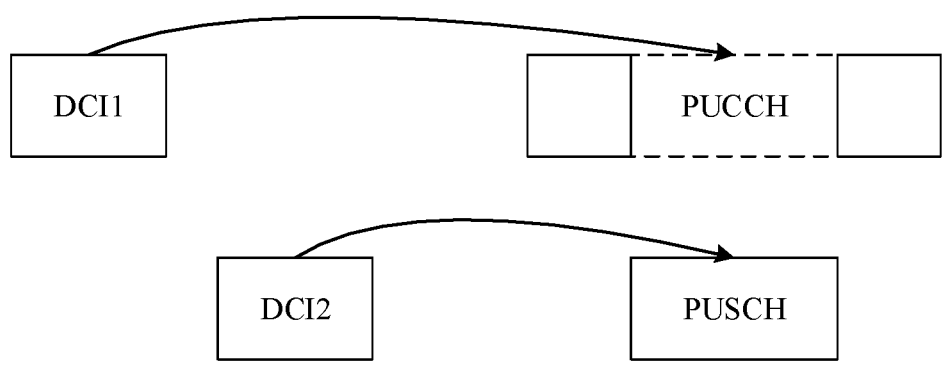
FIG. 10 is a schematic block diagram illustrating that a terminal device determines, according to a time domain position of first information, to transmit one of multiple uplink channels/signals in the scenario in FIG. 7 according to an embodiment of the disclosure.

With reference to FIG. 7 to FIG. 10, FIG. 7 is an example of a scenario where there are two channels/signals for a terminal device according to an embodiment of the disclosure. FIG. 8 to FIG. 10 are schematic block diagrams illustrating that a terminal device determines to, according to a time domain position of first information, transmit one of multiple uplink channels/signals in the scenario in FIG. 7 according to an embodiment of the disclosure.

As shown in FIG. 7, the channels/signals to be transmitted of the terminal device may include: a dynamically scheduled PUSCH, and a PUCCH carrying ACK/NACK feedback information corresponding to a dynamically scheduled PDSCH. When downlink control signaling 2 has a latter time domain position, the terminal device may determine that the PUSCH has high priority. The terminal device may determine that only the PUSCH is transmitted starting from the overlap of the time domain. Specifically, as shown in FIG. 8, the terminal device may determine that only the PUSCH is transmitted starting from the overlap of the time domain; as shown in FIG. 9, the terminal device may determine that only the PUSCH is transmitted; and as shown in FIG. 10, the terminal device may also determine that only the PUSCH is transmitted at the overlap of the time domain. It is to be understood that the solid boxes in FIG. 8 to FIG. 10 represent that transmission is performed, and the dashed boxes represent that the transmission is not preformed.

In another specific embodiment, the terminal device may determine to transmit one of the multiple uplink channels/ signals based on a time domain position and a category of the first information associated with each of the multiple uplink channels/signals.

Figure 11:
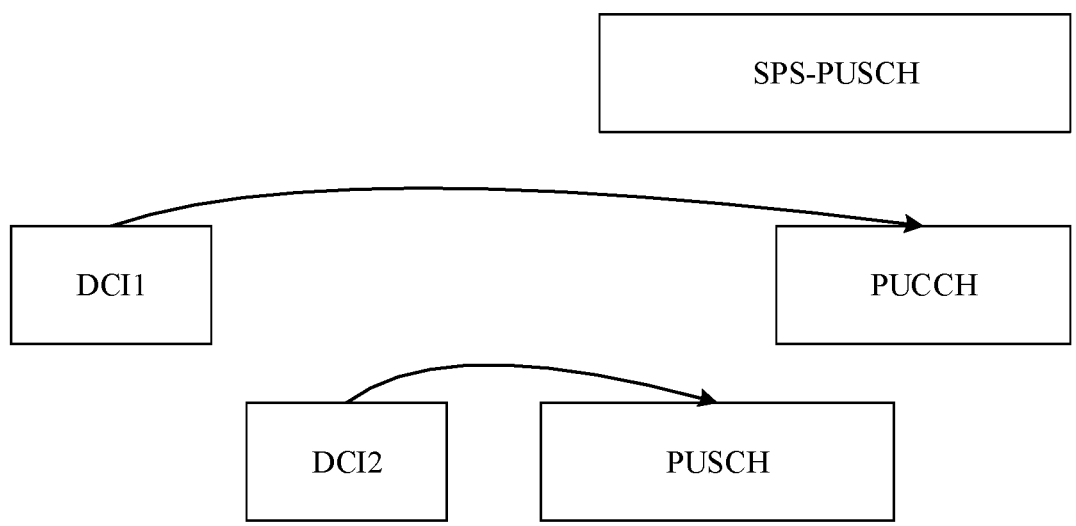
FIG. 11 is an example of a scenario where there are three channels/signals for a terminal device according to an embodiment of the disclosure.
Figure 12:
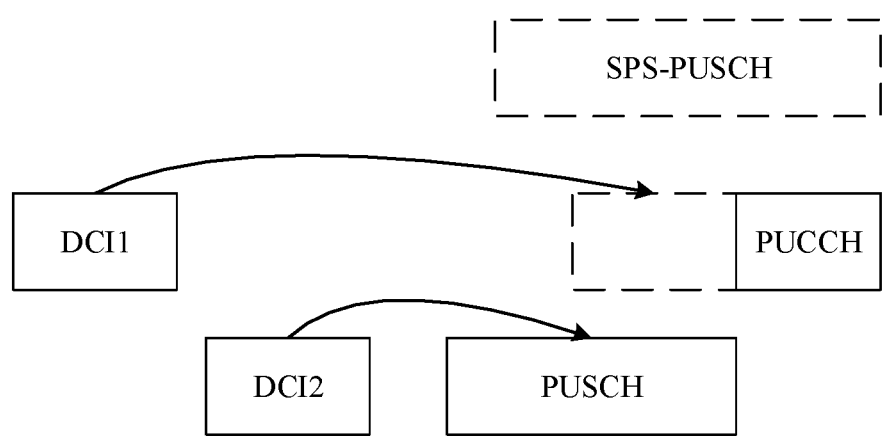
FIG. 12 is a schematic block diagram illustrating that a terminal device determines, according to first information, to transmit one of three uplink channels/signals in the scenario in FIG. 11 according to an embodiment of the disclosure.
Figure 13:
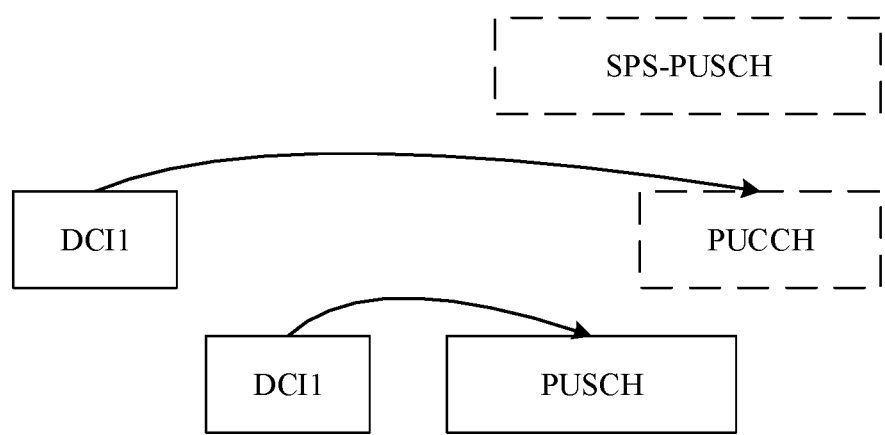
FIG. 13 is another schematic block diagram illustrating that a terminal device determines, according to first information, to transmit one of three uplink channels/signals in the scenario in FIG. 11 according to an embodiment of the disclosure.

With reference to FIG. 11 to FIG. 13, FIG. 11 is an example of a scenario where there are three channels/signals for a terminal device according to an embodiment of the disclosure. FIG. 12 to FIG. 13 are schematic block diagrams illustrating that a terminal device determines, according to a time domain position and a category of first information, to transmit one of three uplink channels/signals in the scenario in FIG. 11 according to an embodiment of the disclosure.

As shown in FIG. 11, the multiple channels/signals to be transmitted of the terminal device may include:

a semi-persistent PUSCH (SPS PUSCH), a PUCCH carrying ACK/NACK feedback information corresponding to a dynamically scheduled PDSCH, and a dynamically scheduled PUSCH. In combination with the descriptions of the above embodiments, the terminal device may determine the order of priority from high to low, that is, the first is the dynamically scheduled PUSCH, the second is the PUCCH carrying ACK/NACK feedback information corresponding to the dynamically scheduled PDSCH, and the third is the SPS PUSCH. That is, the terminal device may determine that only the dynamically scheduled PUSCH is transmitted at the overlap of the time domain. Specifically, as shown in FIG. 12, the terminal device may determine that only the PUSCH is transmitted at the overlap portion of the three channels, and only the PUCCH is transmitted at the overlap portion of the SPS PUSCH and the PUCCH. Alternatively, as shown in FIG. 13, the terminal device may determine that only the PUSCH is transmitted. It is to be understood that the solid boxes in FIG. 12 to FIG. 13 represent that transmission is performed, and the dashed boxes represent that the transmission is not preformed.

FIG. 3 to FIG. 13 only take that a terminal device determines to transmit one of multiple uplink channels/signals according to the priority of the first information associated with each of the multiple uplink channels/signals as an example, but the embodiments of the disclosure are not limited thereto. In other embodiments, the terminal device may also determine one of the multiple uplink channels/signals directly according to the priority of each of the multiple uplink channels/signals.

Figure 14:
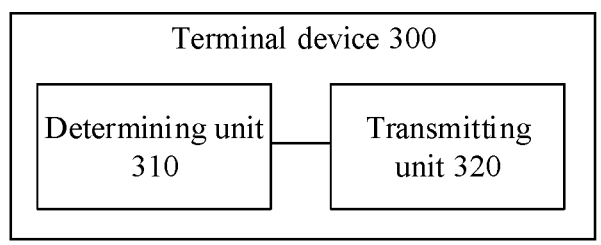
FIG. 14 is a schematic block diagram of a terminal device according to an embodiment of the disclosure.

FIG. 14 is a schematic block diagram of a terminal device according to an embodiment of the disclosure.

As shown in FIG. 14, the terminal device may include a determining unit 310 and a transmitting unit 320.

The determining unit 310 is configured to determine multiple uplink channels/signals to be transmitted, the multiple uplink channels/signals at least partially overlapping in time domain.

The transmitting unit 320 is configured to determine to transmit one of the multiple uplink channels/signals according to first information associated with at least one of the multiple uplink channels/signals.

The multiple uplink channels/signals may include at least one of:
a PUSCH;
a PUCCH; and
a SRS.

The transmitting unit 320 may be configured to:
determine to transmit one of the multiple uplink channels/signals according to a time domain position and/or a category of the first information associated with the at least one of the multiple uplink channels/signals.

The transmitting unit 320 may be configured to:
determine to transmit one of the multiple uplink channels/signals according to a time domain position of the first information associated with each of the multiple uplink channels/signals.

The transmitting unit 320 may be configured to:
determine to transmit an uplink channel/signal corresponding to first information with highest priority among the first information associated with the multiple uplink channels/signals according to a following rule:
in the time domain, first information with a later start position has higher priority than first information with an earlier start position.

The transmitting unit 320 may be configured to:
determine to transmit one of the multiple uplink channels/signals according to a category of the first information associated with each of the multiple uplink channels/signals.

The transmitting unit 320 may be configured to:
determine to transmit an uplink channel/signal corresponding to a category of first information with highest priority among categories of the first information associated with the multiple uplink channels/signals according to a following rule:
DCI has higher priority than higher layer signaling.

The transmitting unit 320 may be configured to:
determine to transmit one of the multiple uplink channels/signals according to a time domain position and a category of the first information associated with each of the multiple uplink channels/signals.

The transmitting unit 320 may be configured to:
determine to transmit an uplink channel/signal corresponding to first information with highest priority among the first information associated with the multiple uplink channels/signals according to following rules:
DCI has higher priority than higher layer signaling; and
when the first information has a same category, first information with a later start position has higher priority than first information with an earlier start position in the time domain.

The categories of the first information may include:
DCI and/or higher layer signaling.

The first information associated with the multiple uplink channel/signals may include that:
when the uplink channel/signal is a dynamically scheduled PUSCH, the associated first information is DCI for scheduling the PUSCH;
when the uplink channel/signal is a PUCCH carrying Acknowledgement/Non-Acknowledgement (ACK/NACK) feedback information corresponding to a dynamically scheduled Physical Downlink Shared Channel (PDSCH), the associated first information is DCI for scheduling the PDSCH;
when the uplink channel/signal is a PUCCH carrying aperiodic Channel State Information (CSI), the associated first information is DCI for triggering transmission of the aperiodic CSI;
when the uplink channel/signal is an aperiodic SRS, the associated first information is DCI for triggering transmission of the aperiodic SRS;
when the uplink channel/signal is an Semi-Persistent Scheduling (SPS) PUSCH, the associated first information is higher layer signaling for indicating transmission parameters of the SPS PUSCH;
when the uplink channel/signal is a PUCCH carrying ACK/NACK feedback information corresponding to an SPS PDSCH, the associated first information is higher layer signaling for indicating transmission parameters of the PUCCH;

when the uplink channel/signal is a PUCCH carrying periodic CSI, the associated first information is higher layer signaling for indicating transmission parameters of the PUCCH;

when the uplink channel/signal is a PUCCH carrying SPS CSI, the associated first information is higher layer signaling for indicating transmission parameters of the PUCCH; and when the uplink channel/signal is a periodic SRS, the associated first information is higher layer signaling for indicating transmission parameters of the periodic SRS.

Figure 15:
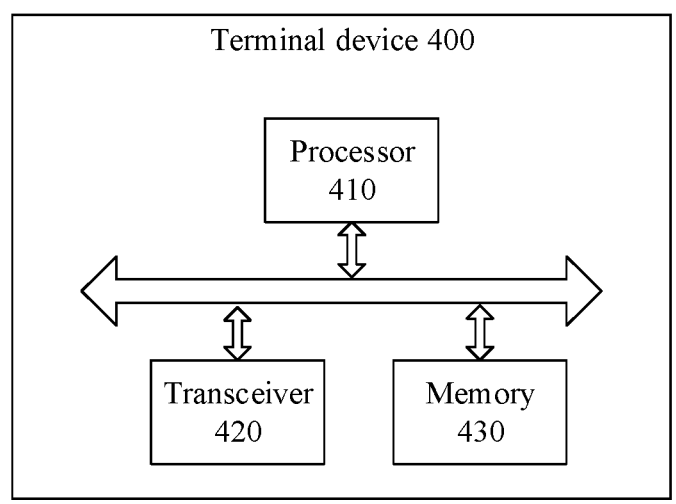
FIG. 15 is a schematic block diagram of another terminal device according to an embodiment of the disclosure.

In the embodiments of the disclosure, the determining unit 310 may be implemented by a processor, and the transmitting unit 320 may be implemented by a transceiver. As shown in FIG. 15, the terminal device 400 may include a processor 410, a transceiver 420 and a memory 430. The memory 430 may be configured to store information and may also be configured to store codes, instructions and the like executed by the processor 410. Each component in the terminal device 400 may be connected through a bus system. The bus system includes a data bus, and may also include a power bus, a control bus and a state signal bus.

The terminal device 400 as shown in FIG. 15 may implement each process implemented by the terminal device in the method embodiment of FIG. 2. For avoiding repetitions, elaborations are omitted herein.

Figure 16:
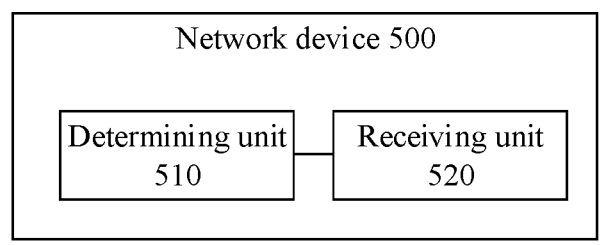
FIG. 16 is a schematic block diagram of a network device according to an embodiment of the disclosure.

FIG. 16 is a schematic block diagram of a network device according to an embodiment of the disclosure.

Specifically, as shown in FIG. 16, the network device 400 may include a determining unit 510 and a receiving unit 520:

The determining unit 510 is configured to determine multiple uplink channels/signals to be received, the multiple uplink channels/signals at least partially overlapping in the time domain.

The receiving unit 520 is configured to determine to receive one of the multiple uplink channels/signals according to first information associated with at least one of the multiple uplink channels/signals.

The multiple uplink channels/signals may include at least one of:
a PUSCH;
a PUCCH; and
a SRS.

The receiving unit 520 may be configured to:
determine to receive one of the multiple uplink channels/signals according to a time domain position and/or a category of the first information associated with the at least one of the multiple uplink channels/signals.

The receiving unit 520 may be configured to:
determine to receive one of the multiple uplink channels/signals according to a time domain position of the first information associated with each of the multiple uplink channels/signals.

The receiving unit 520 may be configured to:
determine to receive an uplink channel/signal corresponding to first information with highest priority among the first information associated with the multiple uplink channel/signal according to a following rule:
in the time domain, first information with a later start position has higher priority than first information with an earlier start position.

The receiving unit 520 may be configured to:
determine to receive one of the multiple uplink channels/signals according to a category of the first information associated with each of the multiple uplink channels/signals.

The receiving unit 520 may be configured to:
determine to receive an uplink channel/signal corresponding to a category of first information with highest priority among categories of the first information associated with the multiple uplink channels/signals according to a following rule:
DCI has higher priority than higher layer signaling.

The receiving unit 520 may be configured to:
determine to receive one of the multiple uplink channels/signals according to a time domain position and a category of the first information associated with each of the multiple uplink channels/signals.

The receiving unit 520 may be configured to:
determine to receive an uplink channel/signal corresponding to first information with highest priority among the first information associated with the multiple uplink channel/signal according to following rules:
DCI has higher priority than higher layer signaling; and
when the first information has a same category, in the time domain, first information with a later start position has higher priority than first information with an earlier start position.

The categories of the first information may include:
DCI and/or higher layer signaling.

The first information associated with the multiple uplink channel/signals may include that:
when the uplink channel/signal is a dynamically scheduled PUSCH, the associated first information is DCI for scheduling the PUSCH;

when the uplink channel/signal is a PUCCH carrying Acknowledgement/Non-Acknowledgement (ACK/NACK) feedback information corresponding to a dynamically scheduled Physical Downlink Shared Channel (PDSCH), the associated first information is DCI for scheduling the PDSCH;

when the uplink channel/signal is a PUCCH carrying aperiodic Channel State Information (CSI), the associated first information is DCI for triggering transmission of the aperiodic CSI;

when the uplink channel/signal is an aperiodic SRS, the associated first information is DCI for triggering transmission of the aperiodic SRS;

when the uplink channel/signal is an Semi-Persistent Scheduling (SPS) PUSCH, the associated first information is higher layer signaling for indicating transmission parameters of the SPS PUSCH;

when the uplink channel/signal is a PUCCH carrying ACK/NACK feedback information corresponding to an SPS PDSCH, the associated first information is higher layer signaling for indicating transmission parameters of the PUCCH;

when the uplink channel/signal is a PUCCH carrying periodic CSI, the associated first information is higher layer signaling for indicating transmission parameters of the PUCCH;

when the uplink channel/signal is a PUCCH carrying SPS CSI, the associated first information is higher layer signaling for indicating transmission parameters of the PUCCH; and when the uplink channel/signal is a periodic SRS, the associated first information is higher layer signaling for indicating transmission parameters of the periodic SRS.

Figure 17:
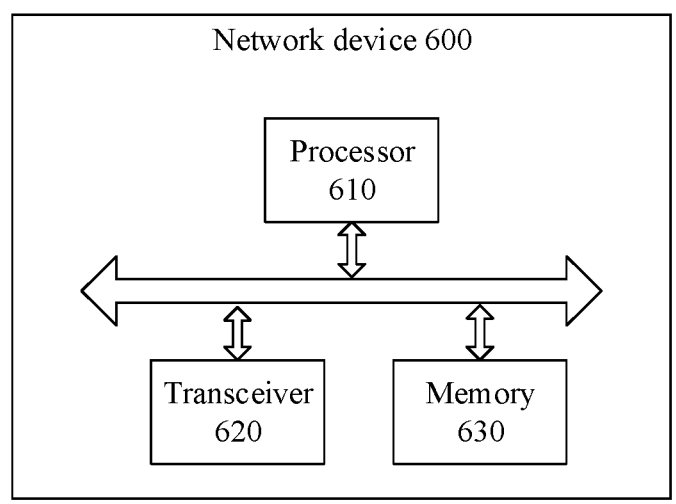
FIG. 17 is a schematic block diagram of another network device according to an embodiment of the disclosure.

In the embodiments of the disclosure, the determining unit 510 may be implemented by a processor, and the receiving unit 520 may be implemented by a transceiver. As shown in FIG. 17, the network device 600 may include a processor 610, a transceiver 620 and a memory 630. The memory 630 may be configured to store indication information and may also be configured to store codes, instructions and the like executed by the processor 610. Each component in the network device 600 may be connected through a bus system. The bus system may include a data bus, and may also include a power bus, a control bus and a state signal bus.

The network device 600 shown in FIG. 17 may implement each process implemented by the network device in the method embodiments. For avoiding repetitions, elaborations are omitted herein.

In an implementation process, each step of the methods in the embodiments of the disclosure may be completed by an integrated logical circuit of hardware in a processor or by instructions in a software form. More specifically, the steps of the methods described in combination with the embodiments of the disclosure may be directly embodied to be executed and completed by a hardware decoding processor or executed and completed by a combination of hardware and software modules in the decoding processor. The software module may be arranged in a mature storage medium in the field, such as a Random Access Memory (RAM), a flash memory, a Read-Only Memory (ROM), a Programmable ROM (PROM) or Electrically Erasable PROM (EEPROM) and a register. The storage medium may be arranged in a memory, and the processor may read information from the memory, and complete the steps of the methods in combination with hardware.

The processor mentioned in the embodiments of the disclosure may be an integrated circuit chip with a signal processing capability and may implement or execute each method, step and logical block diagram described in the embodiments of the disclosure. For example, the processor may be a universal processor, a Digital Signal Processor (DSP), an Application Specific Integrated Circuit (ASIC), a Field Programmable Gate Array (FPGA) or other programmable logical devices, transistor logical devices and discrete hardware components. Moreover, the universal processor may be a microprocessor or any conventional processor and the like.

Moreover, the memory mentioned in the embodiments of the disclosure may be a volatile memory or a nonvolatile memory, or may include both the volatile and nonvolatile memories. The nonvolatile memory may be an ROM, a PROM, an Erasable PROM (EPROM), an EEPROM or a flash memory. The volatile memory may be an RAM, and is used as an external high-speed cache. It is to be understood that the memories above mentioned are exemplarily but unlimitedly. For example, the memories in the embodiments of the disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). That is, the memory of a system and method described in the disclosure is intended to include, but not limited to, memories of these and any other proper types.

It is finally to be noted that terms used in the embodiments and appended claims of the disclosure are only for the purpose of describing the specific embodiments and not intended to limit the embodiments of the disclosure.

For example, singular forms "a/an", "said" and "the" used in the embodiments and appended claims of the disclosure are also intended to include plural forms unless other meanings are clearly expressed in the context. For another example, based on the context, term "while" used here may be explained as "if" or "in case of" or "when" or "responsive to determining" or "responsive to detecting". Similarly, based on the context, phrase "if determining" or "if detecting (stated condition or event)" may be explained as "when determining" or "responsive to determining" or "when detecting (stated condition or event)" or "responsive to detecting (stated condition or event)".

Those of ordinary skill in the art may realize that the units and algorithm steps of each example described in combination with the embodiments described in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the embodiments of the disclosure.

Those skilled in the art may clearly learn about that specific working processes of the system, device and unit described above may refer to the corresponding processes in the method embodiment and will not be elaborated herein for convenient and brief description.

In some embodiments provided by the present application, it is to be understood that the described system, device and method may be implemented in other manners. For example, the device embodiments described above are only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the embodiments of the disclosure according to a practical requirement.

Moreover, all the function units in the embodiments of the disclosure may be integrated in a processing unit; or the units exist separately and physically; or two or more than two units are integrated in a unit.

When being realized in form of software functional unit and sold or used as an independent product, the function may also be stored in a computer-readable storage medium. Based on such an understanding, the technical solutions of the embodiments of the disclosure substantially or parts making contributions to the prior art or part of the technical solutions may be embodied in form of software product, and the computer software product is stored in a storage medium, including multiple instructions configured to enable a computer device (which may be a personal computer, a server, a network device or the like) to execute all or part of the steps of the method in the embodiments of the disclosure. The foregoing storage medium includes any medium that can store program code, such as a U disk, a removable hard disk, an ROM, an RAM, a magnetic disk, or an optical disc.

The above is only the specific implementation mode of the embodiments of the disclosure and not intended to limit the scope of protection of the embodiments of the disclosure. Any variations or replacements apparent to those skilled in the art within the technical scope described by the embodiments of the disclosure shall fall within the scope of protection of the embodiments of the disclosure. Therefore, the scope of protection of the embodiments of the disclosure shall be subject to the scope of protection of the claims.

The invention claimed is:

1. A method for transmitting information, comprising:
   determining, by a terminal device, multiple uplink channels to be transmitted, the multiple uplink channels at least partially overlapping in a time domain, wherein the multiple uplink channels comprise a dynamically scheduled Physical Uplink Shared Channel (PUSCH) and a Physical Uplink Control Channel (PUCCH) carrying Acknowledgement/Non-Acknowledgement (ACK/NACK) feedback information corresponding to a dynamically scheduled Physical Downlink Shared Channel (PDSCH); and
   determining, by the terminal device, to transmit one uplink channel of the multiple uplink channels according to a time domain position of first information associated with at least one of the multiple uplink channels, wherein the first information is scheduling information associated with each of the multiple uplink channels or is configuration information associated with each of the multiple uplink channels,
   wherein determining, by the terminal device, to transmit the one uplink channel of the multiple uplink channels according to the time domain position of the first information associated with the at least one of the multiple uplink channels comprises:
   comparing a time domain position of first information associated with the dynamically scheduled PUSCH with a time domain position of first information associated with the PUCCH, and
   determining the one uplink channel according to a comparison result.

2. The method of claim 1, further comprising:
   determining, by the terminal device, to transmit the one uplink channel corresponding to first information with a highest priority among the first information associated with the multiple uplink channels, wherein the first information with the highest priority is first information with a latest start position in the time domain.

3. The method of claim 2, wherein when the first information associated with the multiple uplink channels is of a same category, the first information with the highest priority is the first information with the latest start position in the time domain.

4. The method of claim 1, further comprising:
   determining, by the terminal device, to transmit the one uplink channel of the multiple uplink channels according to a category of the first information associated with the at least one of the multiple uplink channels, the category of the first information comprising at least one of Downlink Control Information (DCI) or higher layer signaling,
   wherein the PUSCH is a dynamically scheduled PUSCH or a Semi-Persistent Scheduling (SPS) PUSCH,
   wherein the first information associated with the dynamically scheduled PUSCH is DCI for scheduling the dynamically scheduled PUSCH, and the first information associated with the PUCCH carrying ACK/NACK feedback information corresponding to the SPS PDSCH is higher layer signaling for indicating transmission parameters of the PUCCH; and
   wherein the PUCCH is a PUCCH carrying ACK/NACK feedback information corresponding to a dynamically scheduled PDSCH or is a PUCCH carrying ACK/NACK feedback information corresponding to an SPS PDSCH, and
   wherein the first information associated with the PUCCH carrying ACK/NACK feedback information corresponding to the dynamically scheduled PDSCH is DCI for scheduling the PDSCH, and the first information associated with the SPS PUSCH is higher layer signaling for indicating transmission parameters of the SPS PUSCH.

5. The method of claim 4, wherein:
   the multiple uplink channels comprise a PUCCH carrying Channel State Information (CSI), the first information associated with the PUCCH carrying CSI is higher layer signaling, the dynamically scheduled PUSCH is determined to be transmitted, and the PUCCH carrying ACK/NACK feedback information corresponding to the dynamically scheduled PDSCH is determined to be transmitted.

6. The method of claim 4, further comprising:
   determining, by the terminal device, to transmit the one uplink channel corresponding to the category of the first information with highest priority among categories of the first information associated with the multiple uplink channels according to a following rule:
   the higher layer signaling has a higher priority than the DCI.

7. A method for receiving information, comprising:
   determining, by a network device, multiple uplink channels to be received, the multiple uplink channels at least partially overlapping in a time domain, wherein the multiple uplink channels comprise a dynamically scheduled Physical Uplink Shared Channel (PUSCH) and a Physical Uplink Control Channel (PUCCH) carrying Acknowledgement/Non-Acknowledgement (ACK/NACK) feedback information corresponding to a dynamically scheduled Physical Downlink Shared Channel (PDSCH); and
   determining, by the network device, to receive one uplink channel of the multiple uplink channels according to a time domain position of first information associated with at least one of the multiple uplink channels, wherein the first information is scheduling information associated with each of the multiple uplink channels or is configuration information associated with each of the multiple uplink channels,
   wherein determining, by the network device, to receive the one uplink channel of the multiple uplink channels according to the time domain position of the first information associated with the at least one of the multiple uplink channels comprises:
   comparing a time domain position of first information associated with the dynamically scheduled PUSCH with a time domain position of first information associated with the PUCCH, and
   determining the one uplink channel according to a comparison result.

8. The method of claim 7, further comprising:
   determining, by the network device, to receive the one uplink channel corresponding to first information with a highest priority among the first information associated with the multiple uplink channels, wherein the first information with the highest priority is first information with a latest start position in the time domain.

9. The method of claim 8, wherein when the first information associated with the multiple uplink channels is of a same category, the first information with the highest priority is the first information with the latest start position in the time domain.

10. The method of claim 7, further comprising:
determining, by the network device, to receive the one uplink channel of the multiple uplink channels according to a category of the first information associated with the at least one of the multiple uplink channels, the category of the first information comprising at least one of Downlink Control Information (DCI) or higher layer signaling,
wherein the PUSCH is a dynamically scheduled PUSCH or a Semi-Persistent Scheduling (SPS) PUSCH,
wherein the first information associated with the dynamically scheduled PUSCH is DCI for scheduling the dynamically scheduled PUSCH, and the first information associated with the PUCCH carrying ACK/NACK feedback information corresponding to the SPS PDSCH is higher layer signaling for indicating transmission parameters of the PUCCH; and
wherein the PUCCH is a PUCCH carrying ACK/NACK feedback information corresponding to a dynamically scheduled PDSCH or is a PUCCH carrying ACK/NACK feedback information corresponding to an SPS PDSCH, and
wherein the first information associated with the PUCCH carrying ACK/NACK feedback information corresponding to the dynamically scheduled PDSCH is DCI for scheduling the PDSCH, and the first information associated with the SPS PUSCH is higher layer signaling for indicating transmission parameters of the SPS PUSCH.

11. The method of claim 10, wherein:
the multiple uplink channels comprise a PUCCH carrying Channel State Information (CSI), the first information associated with the PUCCH carrying CSI is higher layer signaling, the dynamically scheduled PUSCH is determined to be transmitted, and the PUCCH carrying ACK/NACK feedback information corresponding to the dynamically scheduled PDSCH is determined to be transmitted.

12. The method of claim 10, further comprising:
determining, by the network device, to receive the one uplink channel corresponding to the category of the first information with highest priority among categories of the first information associated with the multiple uplink channels according to a following rule:
the higher layer signaling has a higher priority than the DCI.

13. A terminal device, comprising: a processor, and a transceiver connected to the processor to transmit and receive information under control of the processor,
wherein the processor is configured to:
determine multiple uplink channels to be transmitted, the multiple uplink channels at least partially overlapping in a time domain, wherein the multiple uplink channels comprise a dynamically scheduled Physical Uplink Shared Channel (PUSCH) and a Physical Uplink Control Channel (PUCCH) carrying Acknowledgement/Non-Acknowledgement (ACK/NACK) feedback information corresponding to a dynamically scheduled Physical Downlink Shared Channel (PDSCH);
determine to transmit one uplink channel of the multiple uplink channels according to a time domain position of first information associated with at least one of the multiple uplink channels, wherein the first information is scheduling information associated with each of the multiple uplink channels or is configuration information associated with each of the multiple uplink channels;
compare a time domain position of first information associated with the dynamically scheduled PUSCH with a time domain position of first information associated with the PUCCH, and
determine the one uplink channel according to a comparison result.

14. The terminal device of claim 13, wherein the processor is further configured to:
determine to transmit the one uplink channel corresponding to first information with a highest priority among the first information associated with the multiple uplink channels, wherein the first information with the highest priority is first information with a latest start position in the time domain,
wherein when the first information associated with the multiple uplink channels is of a same category, the first information with the highest priority is the first information with the latest start position in the time domain.

15. A network device, comprising: a processor, and a transceiver connected to the processor to transmit and receive information under control of the processor,
wherein the processor is configured to:
determine multiple uplink channels to be received, the multiple uplink channels at least partially overlapping in a time domain, wherein the multiple uplink channels comprise a dynamically scheduled Physical Uplink Shared Channel (PUSCH) and a Physical Uplink Control Channel (PUCCH) carrying Acknowledgement/Non-Acknowledgement (ACK/NACK) feedback information corresponding to a dynamically scheduled Physical Downlink Shared Channel (PDSCH);
determine to receive one uplink channel of the multiple uplink channels according to a time domain position of first information associated with at least one of the multiple uplink channels, wherein the first information is scheduling information associated with each of the multiple uplink channels or is configuration information associated with each of the multiple uplink channels;
compare a time domain position of first information associated with the dynamically scheduled PUSCH with a time domain position of first information associated with the PUCCH, and
determine the one uplink channel according to a comparison result.

16. The network device of claim 15, wherein the processor is configured to:
determine to receive the one uplink channel corresponding to first information with a highest priority among the first information associated with the multiple uplink channels, wherein the first information with the highest priority is first information with a latest start position in the time domain,
wherein when the first information associated with the multiple uplink channels is of a same category, the first information with the highest priority is the first information with the latest start position in the time domain.

* * * * *